(12) United States Patent
Machida

(10) Patent No.: US 11,245,803 B2
(45) Date of Patent: Feb. 8, 2022

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Masahiro Machida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 151 days.

(21) Appl. No.: 16/554,597

(22) Filed: Aug. 28, 2019

(65) Prior Publication Data

US 2020/0076972 A1    Mar. 5, 2020

(30) Foreign Application Priority Data

Sep. 5, 2018    (JP) .............................. JP2018-165735

(51) Int. Cl.
*H04N 1/08*    (2006.01)
*H04N 1/00*    (2006.01)

(52) U.S. Cl.
CPC ..... *H04N 1/00506* (2013.01); *H04N 1/00424* (2013.01); *H04N 1/00442* (2013.01); *H04N 1/00469* (2013.01)

(58) Field of Classification Search
CPC ....................... H04N 1/00506; H04N 1/00424
See application file for complete search history.

(56) References Cited

U.S. PATENT DOCUMENTS 6,906,822 B1 *  6/2005  Nohnishi ............... G06K 15/02
                                                    358/1.14
2010/0182412 A1 *  7/2010  Taniguchi .............. G16H 40/63
                                                    348/65

FOREIGN PATENT DOCUMENTS

JP    2012068998    4/2012

* cited by examiner

*Primary Examiner* — Ibrahim Siddo
(74) *Attorney, Agent, or Firm* — JCIPRNET

(57) ABSTRACT

An information processing apparatus includes an acquisition unit acquires electronic data, and a display control unit that in a case where there is a page meeting a predetermined condition in the electronic data, performs control to display a thumbnail of the page.

10 Claims, 13 Drawing Sheets

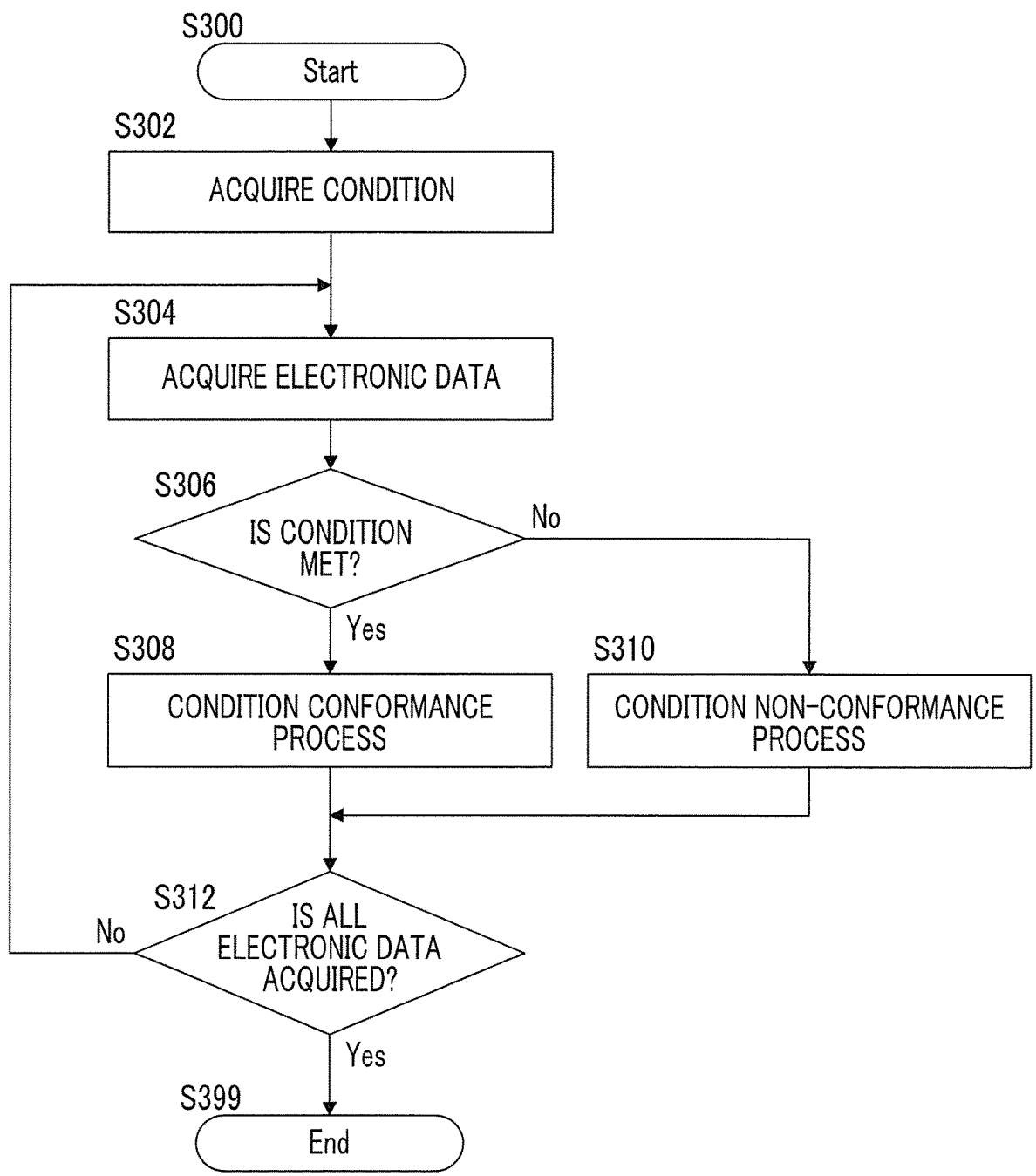

FIG. 4A

| | | |
|---|---|---|
| | EXTRACTION SETTING | OK |
| 410 | FILE UPPER LIMIT | 1024 |
| 420 | COLOR MODE | NONE |
| 430 | DOCUMENT SIZE | NONE |
| 440 | BLANK PAGE | NONE |
| 450 | STAPLE/PUNCH POSITION | NONE |

FIG. 4B

| | | |
|---|---|---|
| | EXTRACTION SETTING | OK |
| 410 | FILE UPPER LIMIT | NONE |
| 420 | COLOR MODE | COLOR |
| 430 | DOCUMENT SIZE | A3 |
| 440 | BLANK PAGE | NONE |
| 450 | STAPLE/PUNCH POSITION | NONE |

FIG. 4C

| | | |
|---|---|---|
| | EXTRACTION SETTING | OK |
| 410 | FILE UPPER LIMIT | NONE |
| 420 | COLOR MODE | NONE |
| 430 | DOCUMENT SIZE | NONE |
| 440 | BLANK PAGE | DETECT |
| 450 | STAPLE/PUNCH POSITION | OVERLAP IS SHOWN |

FIG. 7A

| 705 | 710 | 715 | |
|---|---|---|---|
| DOCUMENT SIZE | STAPLE COUNT | POSITION | ... |
| | | | |

| 755 | 760 | 765 | |
|---|---|---|---|
| DOCUMENT SIZE | PUNCH HOLE COUNT | POSITION | ... |
| | | | |

| 805 | 810 | 815 |
|---|---|---|
| READING WIDTH | DOCUMENT SIZE | READING DIRECTION |
| | | |

800

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2018-165735 filed Sep. 5, 2018.

BACKGROUND

(i) Technical Field

The present invention relates to an information processing apparatus and a non-transitory computer readable medium storing an information processing program.

(ii) Related Art

An object of JP2012-068998A is to provide a document processing apparatus and a document processing program, capable of controlling preview display in order to properly instruct printing, and JP2012-068998A discloses a document processing apparatus that instructs printing of a document, including a display unit that displays an image to be printed, in a case of printing the document on a printing medium under a predetermined printing condition; an image analysis unit that analyzes a feature of the image; a warning determination unit that compares the analyzed feature of the image with preset warning conditions, and determines whether or not the feature of the image meets the warning conditions; and a display control unit that displays the image on the display unit, before instructing printing of the document, in a case where the feature of the image meets the warning conditions.

SUMMARY

As a preliminary checking work for processing electronic data such as a document consisting of pages, thumbnail display (reduced display) of all pages is performed. However, even though thumbnails of all the pages are displayed, a user does not know which page to look at, so overlooking may occur in the checking work of the thumbnail page.

Aspects of non-limiting embodiments of the present disclosure relate to an information processing apparatus and a non-transitory computer readable medium storing an information processing program, capable of specifying and displaying a page that a user needs to pay attention to, in a technique of displaying thumbnails of pages of electronic data.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including an acquisition unit that acquires electronic data; and a display control unit that in a case where there is a page meeting a predetermined condition in the electronic data, performs control to display a thumbnail of the page.

BRIEF DESCRIPTION OF THE DRAWINGS

Exemplary embodiment(s) of the present invention will be described in detail based on the following figures, wherein:

FIG. 3 is a flowchart showing a processing example according to the exemplary embodiment;

FIGS. 4A to 4C are explanatory diagrams showing examples of an extraction setting screen displayed according to the exemplary embodiment;

FIGS. 7A and 7B are explanatory diagrams showing examples of data structures of a staple information table and a punch information table, respectively;

FIG. 8 is an explanatory diagram showing an example of a data structure of a reading direction table;

DETAILED DESCRIPTION

Hereinafter, an exemplary embodiment of the present invention will be described in detail with reference to the accompanying drawings.

Figure 1:
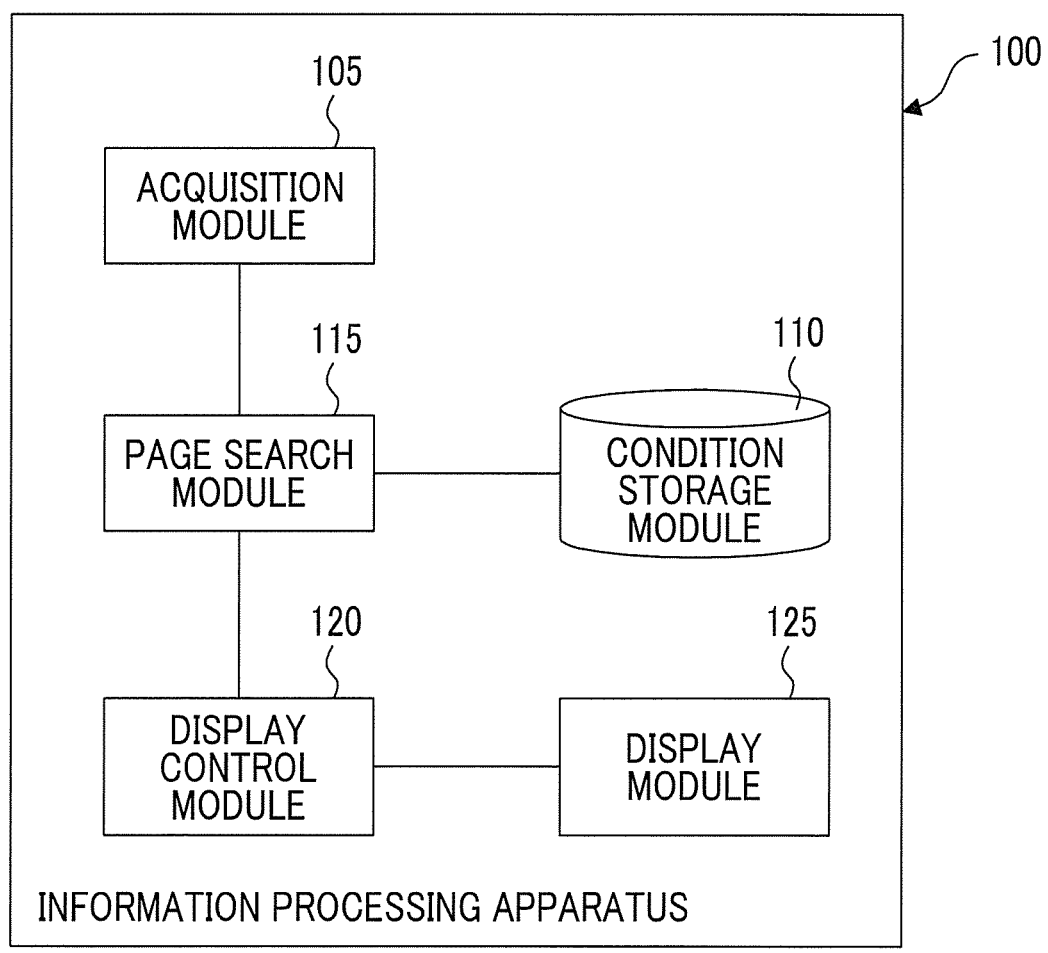
FIG. 1 is a conceptual module configuration diagram of a configuration example of an exemplary embodiment.

FIG. 1 shows a conceptual module configuration diagram of a configuration example of the exemplary embodiment.

The term "module" generally refers to a component such as software (computer program) or hardware, which can be logically separated. Accordingly, the module in the exemplary embodiment refers not only to a module in a computer program but also a module in a hardware configuration. Therefore, in the exemplary embodiment, a description will be made about computer programs causing a computer to function as the modules (a program causing a computer to execute respective procedures, a program causing a computer to function as respective means, and a program causing a computer to implement each function), a system, and a method. However, for the sake of convenience of explanation, the words "storing", "causing to store", and the equivalent wording are used, but these wordings mean that storing in a storage device or controlling so as to store in a storage device, in a case where the exemplary embodiment is a computer program. In addition, although modules may correspond one-to-one to functions, in implementation, one module may be configured with one program, or plural modules may be configured with one program, and conversely, one module may be configured with plural programs. Further, plural modules may be executed by one computer, or one module may be executed by plural computers, by a computer in a distributed or parallel environment. Note that one module may include another module. Hereinafter, "connection" is also used in the case of a logical connection (data transfer, instruction, reference relation between data, login, or the like), in addition to physical connection. "Predetermined" means that it is determined before a targeted process, and is also used as a meaning that it is determined of course before a process according to the exemplary embodiment starts, and even after the process according to the exemplary embodiment starts, in a case where it is a time before a targeted process, it is determined depending on the situation or state at that time, or depending on the situation or state until that time. In the case where there are plural "predetermined values", the values may be different from each other, or at least two values among the values may be the same as each other (including all the values, of course). In addition, the statement "to perform B in a case of A" is used to mean "to determine whether it is A or not, and B is used in a case where it is determined to be A". However, excluded are cases where it is unnecessary to determine whether it is A or not. Further, unless otherwise noted, a case of enumerating things like "A, B, and C" is an example of enumeration, and includes cases where only one of the enumerated things is selected (for example, A only).

Further, a system or an apparatus includes a configuration in which plural computers, hardware, apparatuses, and the like are connected by communication means such as a network (including one-to-one correspondence communication connection), as well as a configuration implemented by a single computer, hardware, apparatus, or the like. "Apparatus" and "system" are used synonymously with each other. Of course, the "system" does not include things that are merely a social "mechanism" (social system) which is an artificial arrangement.

Further, for each process by each module or for each process in a case where plural processes are performed in the module, target information is read from the storage device, the process is performed, and then the process result is written in the storage device. Therefore, a description about reading from the storage device before processing and writing to the storage device after the processing may be omitted in some cases. Note that the storage device here may include a hard disk, a random access memory (RAM), an external storage medium, a storage device through a communication line, a register in a central processing unit (CPU), or the like.

As shown in the example of FIG. 1, the information processing apparatus 100 according to the present exemplary embodiment is used to process electronic data, and includes an acquisition module 105, a condition storage module 110, a page search module 115, a display control module 120, and a display module 125.

The acquisition module 105 is connected to the page search module 115. The acquisition module 105 acquires electronic data. Here, "electronic data" is data in which at least the portion to be displayed to the user is configured with pages, and generally includes a document. Examples thereof include print data printed by a printer, image data read by a scanner, and the like. A document (also referred to as a file) is text data, numerical data, graphic data, image data, moving picture data, speech data, or a combination thereof, which is subject to storing, editing, or searching, and can be exchanged as individual units between systems or between users, and includes similar data. Specifically, the document includes a document created by a document creation program (so-called word processor software), an image read by an image reading apparatus (scanner or the like), a Web page, or the like.

"Acquiring electronic data" includes, for example, reading an image with a scanner, a camera or the like, receiving an image from an external device through a communication line with a facsimile or the like, reading an image stored in a hard disk (including not only those built into the computer but also those connected through a network), or the like. The image may be a binary image or a multi-level image (including a color image). The number of images received may be one or plural. Further, the content of the image may be a document used for business, a pamphlet for advertisement promotion, or the like.

The condition storage module 110 is connected to the page search module 115. The condition storage module 110 stores predetermined conditions. Specifically, as the "predetermined condition" here, there is a condition set on the extraction setting screen 400 which will be described later using the examples of FIGS. 4A to 4C. For example, there is an upper limit data amount of electronic data.

The page search module 115 is connected to the acquisition module 105, the condition storage module 110, and the display control module 120. The page search module 115 searches for pages that meet the conditions stored in the condition storage module 110 from the electronic data acquired by the acquisition module 105.

The page search module 115 performs a process while acquiring electronic data, and may stop the process in a case where the page meeting the condition is acquired, during acquisition. "Processing" includes, for example, image processing. Specifically, there are print processing, image reading processing, and the like.

Then, the page search module 115 may perform a display for attribute change such that an operation for changing to an attribute not meeting the condition is available, after stopping the process, and resume the process on condition that the attribute change is performed. For example, as a "display for changing the attribute", an attribute setting screen is displayed on the operation panel. As a specific example, in a case where the condition is "the data amount is equal to or larger than the threshold value X", an attribute setting screen for receiving an operation for changing the resolution (an operation for lowering the resolution) may be displayed.

The display control module 120 is connected to the page search module 115 and the display module 125. In a case where there is a page meeting the predetermined condition in the electronic data acquired by the acquisition module 105 (in a case where there is a search result by the page search module 115), the display control module 120 controls the display module 125 so as to display the thumbnail (reduced image) of the page. Here, the "condition" may be related to the attribute of the page. The "attribute" may be any one of a monochrome image, a color image, and a document size. Further, the "condition" may be whether the page is in a normal state or not. Then, "normal state" may be a state where the relationship between the reading direction and the page direction is appropriate, or the position of the accessory is appropriate. Examples of "accessories" include staples, punches, and the like.

The display control module 120 may perform control to display the thumbnail of the page meeting the condition in a form different from a thumbnail of a page not meeting the condition. Here, the "different form" is to make the shape, pattern, color, or the like of the thumbnail of the page meeting the condition different from those of the thumbnail of the page not meeting the condition. Examples include to make the line surrounding the thumbnail thick, to add a color to the thumbnail, to highlight display (including reverse display), to add a message indicating that the condition is met, or the like. In addition, the different form may be those changing dynamically (for example, flash, animation, or the like), blinking (those to be changed in blinking include whether to perform blinking or not, blinking period, blinking interval, or the like), or a combination of these.

In addition, the display control module 120 may perform control to display a thumbnail of only a page not meeting the condition.

In addition, the display control module 120 may perform control to enlarge and display a portion corresponding to the condition.

The display module 125 is connected to the display control module 120. The display module 125 displays images (including thumbnail images), messages, and the like on a display device (also referred to as a panel) under the control of the display control module 120. As a display device, a liquid crystal display, an organic EL display, or the like may be used, and the display device may be configured as a touch panel for detecting a contact position with a finger, a pen or the like.

Figure 2A:
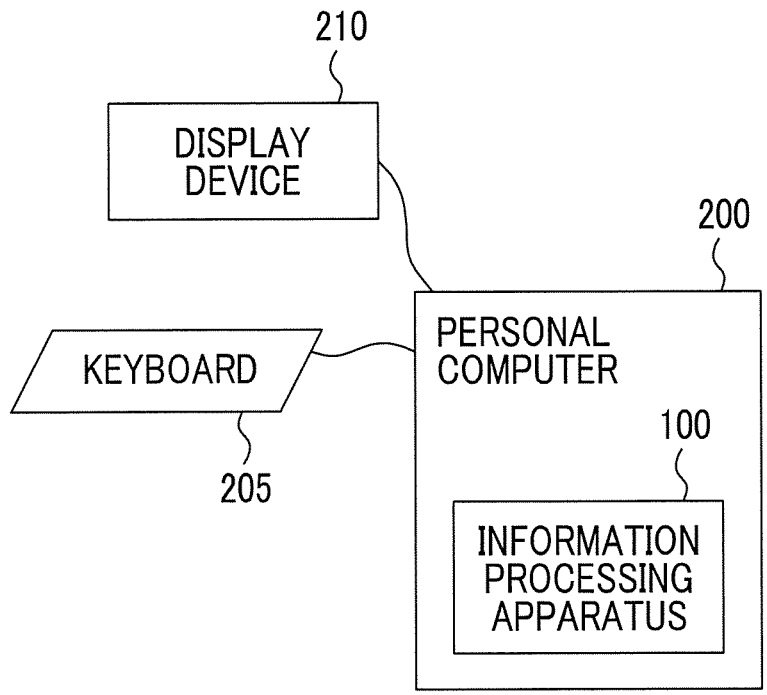
FIGS. 2A and 2B are explanatory diagrams showing system configuration examples using the exemplary embodiment.
Figure 2B:
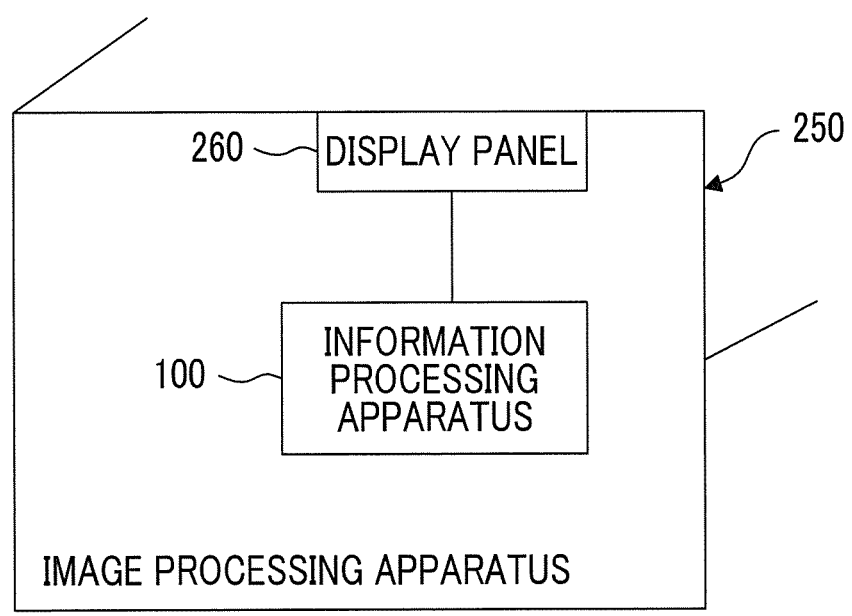

FIGS. 2A and 2B are explanatory diagrams showing system configuration examples using the present exemplary embodiment.

In the example of FIG. 2A, the information processing apparatus 100 is built in the personal computer 200. That is, the personal computer 200 has the information processing apparatus 100, and is connected to the keyboard 205 and the display device 210. The display module 125 displays images on the display device 210.

For example, in the case of printing a document stored in the hard disk, it is determined whether or not there is a page meeting the predetermined condition in the document as preparation before printing. Ina case where there is a meeting page, the thumbnail image of the page is displayed on the display device 210 in a form different from other pages.

In the example of FIG. 2B, the information processing apparatus 100 is built in the image processing apparatus 250. That is, the image processing apparatus 250 has the information processing apparatus 100 and the display panel 260. The information processing apparatus 100 and the display panel 260 are connected to each other. The display module 125 displays images on the display panel 260.

For example, in a case where a process (scan process) of reading an image is performed using the scan function of the image processing apparatus 250, it is determined whether or not the image meets a predetermined condition. In a case where there is a meeting page, the thumbnail image of the page is displayed on the display panel 260 in a form different from other pages. That is, in the case of previewing the thumbnail image of the image under scan accumulation, and in a case where it is determined whether or not a predetermined condition is met, and there is a meeting page, the meeting page is displayed as the page that the user needs to pay attention to.

Here, for example, there are cases where it is desired "to lower the resolution or to change a color image to a monochrome image in a case where the file size is large", or "to omit the A3 document from the scanned images". In the case of performing without using the present exemplary embodiment (image processing apparatus 250), it becomes necessary to visually check such conditions, which causes many man-hours due to human error or complicated work.

Therefore, the image processing apparatus 250 makes it easy to find the document of the feature desired by the user. In particular, at the time of real-time preview display during the reading process, the document having the features desired by the user is displayed in a manner easy to understand by preview.

Hereinafter, as the present exemplary embodiment, a description will be given with an example of processing in the case of using the image processing apparatus 250.

FIG. 3 is a flowchart showing the processing example according to the present exemplary embodiment.

In step S302, the page search module 115 acquires conditions. Before acquiring electronic data, conditions are acquired first. Note that, the conditions may be acquired from the condition storage module 110 or the conditions set by the operation of the user may be acquired. As conditions, for example, "being a monochrome image", "being a color image", "being a specific document size (for example, A3)", "reading direction", "being larger than or equal to an upper limit file size", "being a blank page", "staple/punch position being on the image", or a combination thereof.

In step S304, the acquisition module 105 acquires electronic data.

In step S306, the page search module 115 determines whether or not the conditions are met. In a case where conditions are met, the process proceeds to step S308; otherwise, the process proceeds to step S310.

In step S308, the display control module 120 performs a condition conformance process.

For example, it is possible to display a page meeting the condition by "displaying the meeting pages as thumbnails in a list", "pop-up displaying attribute information on the meeting pages", "enlarging and displaying the corresponding portions of the meeting pages", "enlarging and displaying the feature information of meeting document images" and the like.

In step S310, the display control module 120 performs a condition non-conformance process.

For example, only pages not meeting the conditions are displayed as general thumbnails. That is, other pages (pages meeting the conditions) are displayed by the forms of the thumbnails being changed, but pages not meeting the conditions are displayed by the forms of the thumbnails not being changed.

Further, only pages not meeting the conditions may be displayed as thumbnails. That is, with respect to other pages, the pages are not displayed as they are, but with respect to pages not meeting the conditions, thumbnail images are displayed.

In step S312, the display control module 120 determines whether or not all the electronic data is acquired. In a case where all the electronic data is acquired, the display control module 120 ends the process (step S399); otherwise, the process returns to step S304. For example, the case where scanning of all the documents set in the image processing apparatus 250 (in particular, a document feeder referred to as an auto document feeder (ADF)) is completed corresponds to the end.

FIGS. 4A to 4C are explanatory diagrams showing examples of an extraction setting screen displayed according to the present exemplary embodiment. FIGS. 4A to 4C show processing examples relating to step S302 in the flowchart shown in the example of FIG. 3.

On the screen 400, a file upper limit setting 410, a color mode setting 420, a document size setting 430, a blank page setting 440, a staple/punch position setting 450, and an OK button 490 are displayed. The user performs an operation on the screen 400 to designate a condition for a page to be processed. In this example, in a case where two or more conditions are designated, the conditions are extracted by logical OR, but the conditions may be combined by logical AND, other logical operations NOT, or the like.

In the example of FIG. 4A, "1024" is set as a condition by the file upper limit setting 410. That is, it indicates that pages with a data amount of 1024 KB or more are extracted.

In the example of FIG. 4B, "color" is set as a condition by the color mode setting 420. "A3" is set as a condition by the document size setting 430. In other words, it indicates that "page that is color (not monochrome page)" or "page with document size A3" is extracted.

In the example of FIG. 4C, "detection" is set as a condition by blank page setting 440. "Overlap" is set as a condition by the staple/punch position setting 450. That is, it indicates that "the page is blank" or "it is a page with overlap between the staple position or the punch position and the image in the page".

In a case where the OK button 490 is selected, the condition is determined according to the setting in the screen 400 at that time.

Figure 5:
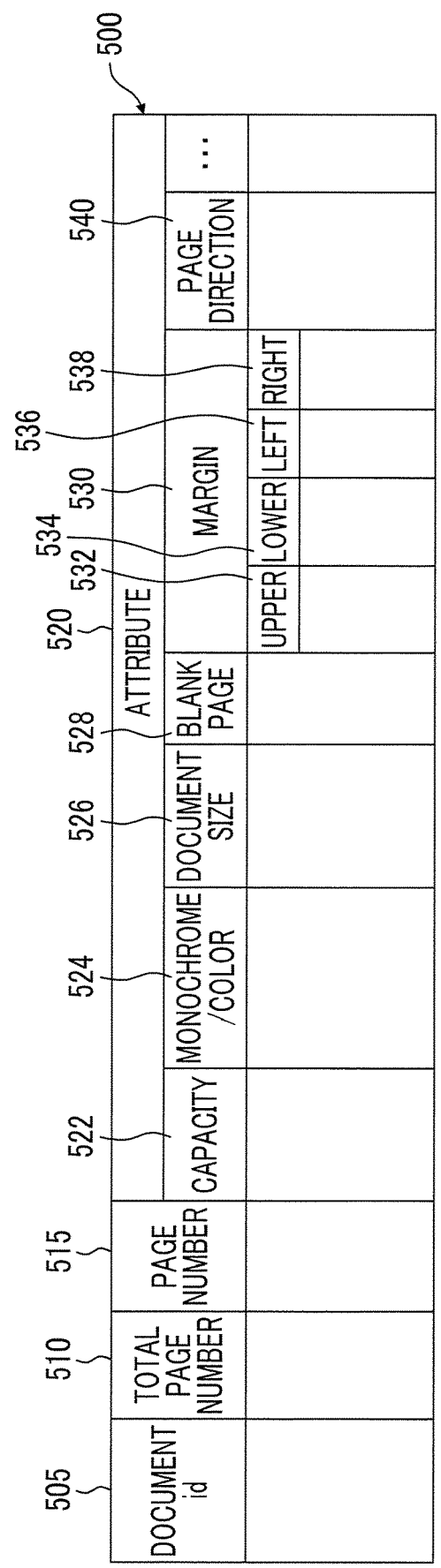
FIG. 5 is an explanatory diagram showing an example of a data structure of a page attribute table.

FIG. 5 is an explanatory diagram showing an example of the data structure of the page attribute table 500. FIG. 5 shows a processing example relating to step S304 in the flowchart shown in the example of FIG. 3. In addition to the page image itself, the attribute (for example, the page attribute table 500) of the page is acquired as the electronic data acquired in step S304.

The page attribute table 500 has a document id field 505, a total page number field 510, a page number field 515, and an attribute field 520. The attribute field 520 has a capacity field 522, a monochrome/color field 524, a document size field 526, a blank page field 528, a margin field 530, and a page direction field 540. The margin field 530 has an upper field 532, a lower field 534, a left field 536, and a right field 538.

In the present exemplary embodiment, the document id field 505 stores information (document id: identification) for uniquely identifying the document. The total page number field 510 stores the total number of pages of the document. The combination of the page number field 515 and the attribute field 520 is continued by the number in the total page number field 510. The page number field 515 stores the page number. Each page can be uniquely identified by the document id and the page number. The attribute field 520 stores attributes of the page. The capacity field 522 stores the data amount of the page. The monochrome/color field 524 stores information indicating whether the page is monochrome or color. The document size field 526 stores the document size of the page. The blank page field 528 stores information indicating whether or not the page is blank. The margin field 530 stores margins of the page. The upper field 532 stores the size of the margin on the upper part of the page. The lower field 534 stores the size of the margin on the lower part of the page. The left field 536 stores the size of the margin on the left of the page. The right field 538 stores the size of the margin on the right of the page. The size of the margin will be described with reference to FIG. 6. The page direction field 540 stores the page direction of the page. Either the landscape mode (landscape orientation) or the portrait mode (portrait orientation) is stored in the page direction field 540.

Figure 6:
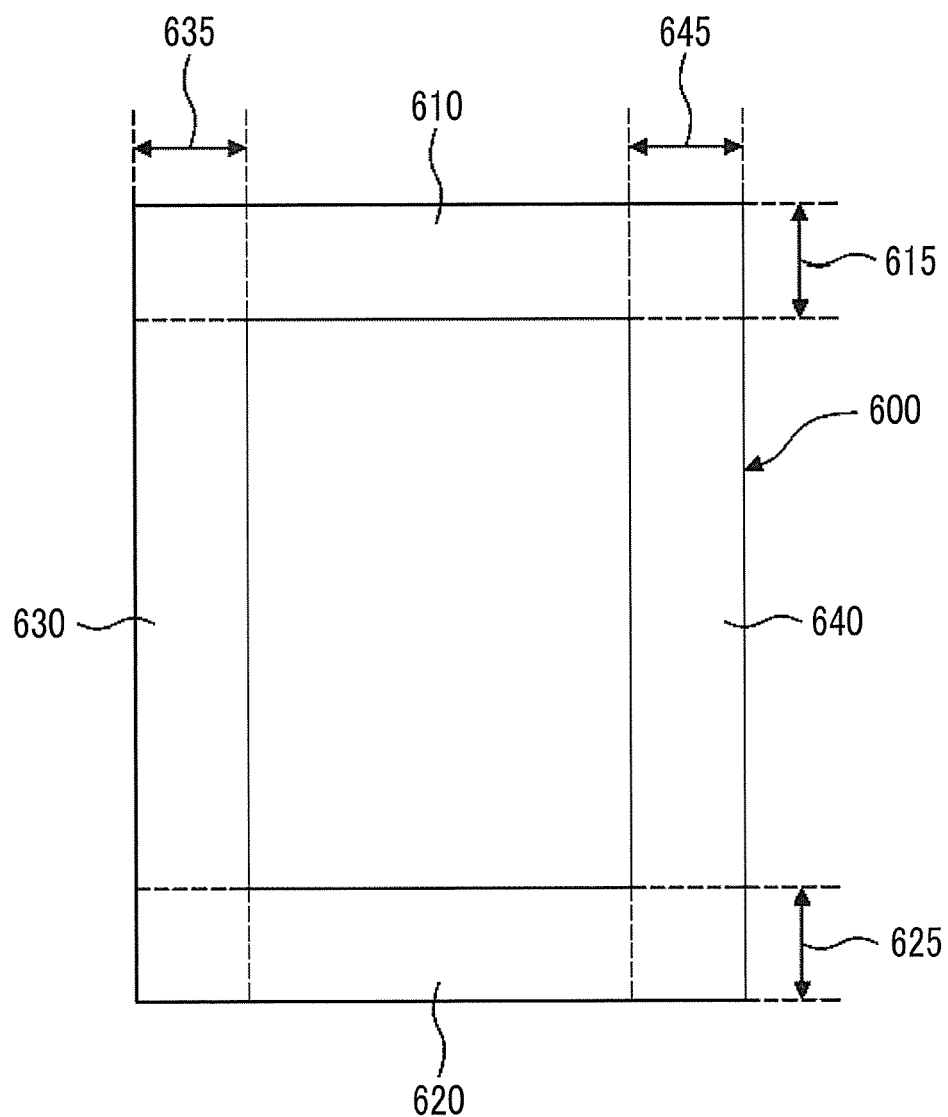
FIG. 6 is an explanatory diagram showing an example of margins of a document image.

FIG. 6 is an explanatory diagram showing an example of the margins of the document image 600.

The document image 600 has a margin (upper) 610, a margin (lower) 620, a margin (left) 630, and a margin (right) 640. The margin (upper) 610, the margin (lower) 620, the margin (left) 630, and the margin (right) 640 are defined by the margin size (upper) 615, the margin size (lower) 625, the margin size (left) 635, and the margin size (right) 645, respectively.

FIGS. 7A and 7B are explanatory diagrams showing examples of data structures of a staple information table 700 and a punch information table 750, respectively. The values in the staple information table 700 and the punch information table 750 are determined by a stapling apparatus or a punch hole drilling machine, which is an accessory (post-processing apparatus) of the image processing apparatus 250, or determined by a user's setting operation. The page search module 115 makes a determination using the staple information table 700 and the punch information table 750.

FIG. 7A is an explanatory diagram showing an example of a data structure of the staple information table 700.

The staple information table 700 has a document size field 705, a staple count field 710, and a position field 715. The document size field 705 stores the document size. The staple count field 710 stores the number of staples. The position field 715 stores the position of the staple (for example, the x-y coordinate in the document).

FIG. 7B is an explanatory diagram showing an example of a data structure of the punch information table 750.

The punch information table 750 has a document size field 755, a punch hole count field 760, and a position field 765. The document size field 755 stores the document size. The punch hole count field 760 stores the number of punch holes. The position field 765 stores the position of the punch hole (for example, the x-y coordinate in the document).

For the determination of the condition "it is a page with overlap between the staple position or the punch position and the image in the page", either (1) it is determined that there is no overlap, in a case where the staple position (position field 715) or the punch position (position field 765) converges within the margin shown in the example of FIG. 6, or (2) it is determined that there is overlap, in a case where the image of the document image 600 is drawn in the staple position or the punch position (area) may be used.

FIG. 8 is an explanatory diagram showing an example of a data structure of a reading direction table 800. The reading direction table 800 stores settings in a case where the image processing apparatus 250 reads a document. The page search module 115 makes a determination using the reading direction table 800.

The reading direction table 800 has a reading width field 805, a document size field 810, and a reading direction field 815. The reading width field 805 stores the reading width. The document size field 810 stores the document size. The reading direction field 815 stores the reading direction. Either the landscape mode (landscape orientation) or the portrait mode (portrait orientation) is stored in the reading direction field 815.

For example, the page search module 115 may detect the reading direction from the size of the read page using the reading direction table 800. The page search module 115 rotates the image in the page four times at intervals of 90 degrees, as the directions of the page, recognizes the characters of the respective images (an erect image, a 90-degree rotation image, a 180-degree rotation image, a 270-degree rotation image), and may set the rotation angle of the image with the most character recognized, as the page direction. In a case where the reading direction matches the page direction, it is determined that the relationship between the reading direction and the page direction is appropriate. In a case of the page direction indicates an erect image, it may be determined that the relationship between the reading direction and the page direction is appropriate.

Figure 9:
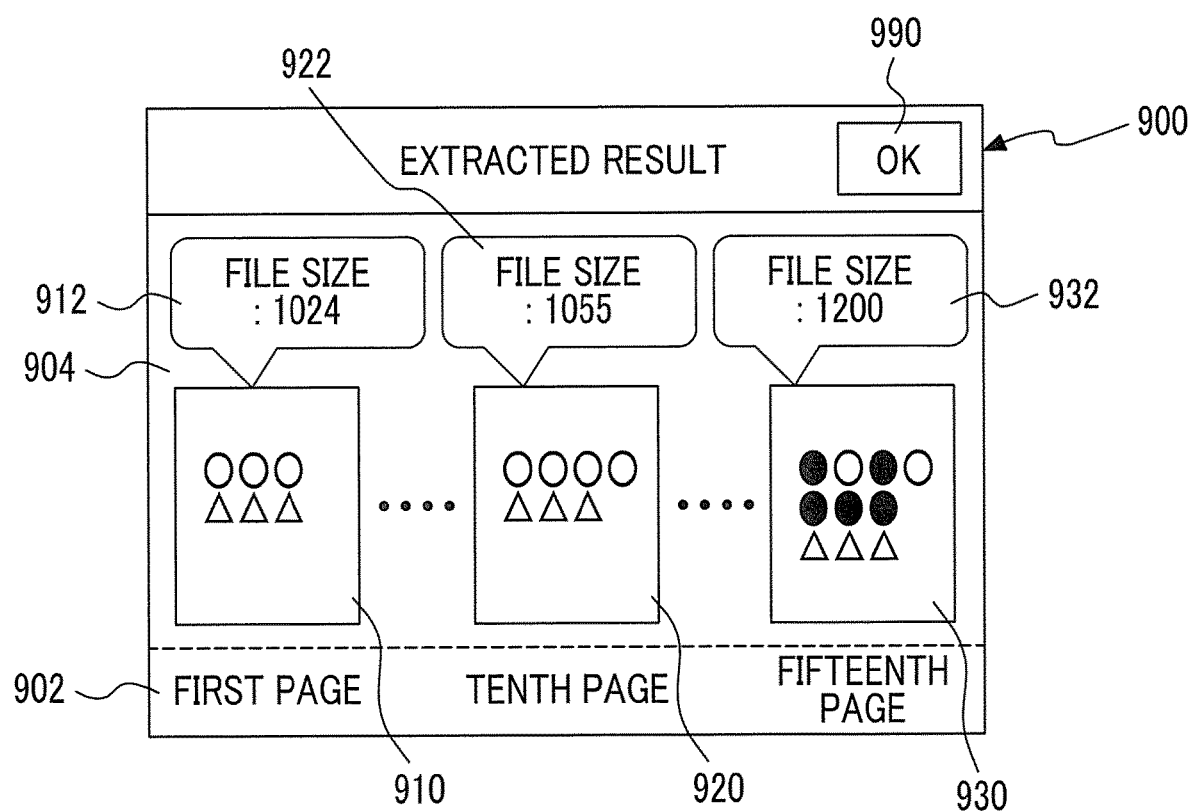
FIG. 9 is an explanatory diagram showing the processing example according to the exemplary embodiment.

FIG. 9 is an explanatory diagram showing a processing example according to the present exemplary embodiment.

On a screen 900, a page number display area 902, a thumbnail display area 904, and an OK button 990 are displayed.

This example shows an example which is obtained by extraction according to the setting shown in FIG. 4A (a page with a data amount of 1024 KB or more), and in which only pages meeting the conditions are displayed, as a display method.

In the thumbnail display area 904, the thumbnail 910 of the first page, the thumbnail 920 of the tenth page, the thumbnail 930 of the fifteenth page are displayed, a balloon comment 912 (file size: 1024) is displayed on the thumbnail 910, a balloon comment 922 (file size: 1055) is displayed on the thumbnail 920, and a balloon comment 932 (file size: 1200) is displayed on the thumbnail 930. Thumbnails of other pages (2 to 9 pages, 11 to 14 pages, or the like) not meeting the condition are not displayed.

Figure 10:
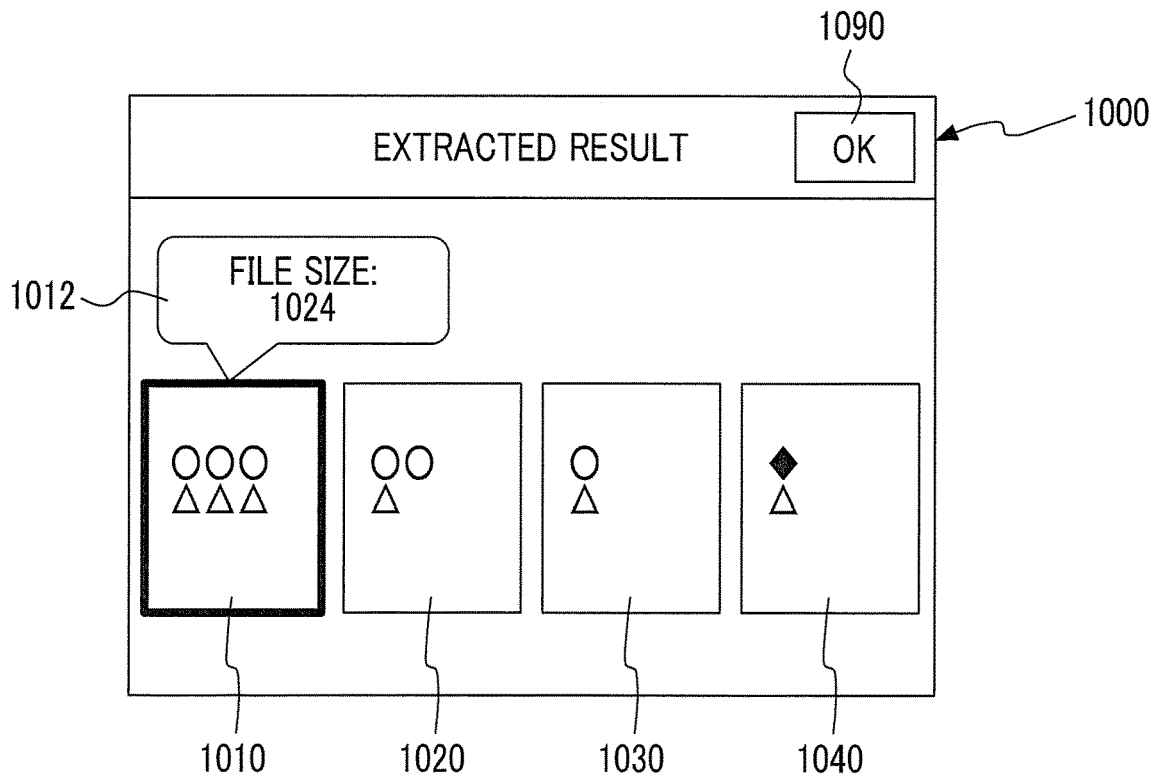
FIG. 10 is an explanatory diagram showing the processing example according to the exemplary embodiment.

FIG. 10 is an explanatory diagram showing a processing example according to the present exemplary embodiment.

A thumbnail 1010, a thumbnail 1020, a thumbnail 1030, a thumbnail 1040, an OK button 1090 are displayed on the screen 1000, and a balloon comment 1012 is displayed on the thumbnail 1010.

This example shows an example which is obtained by extraction according to the setting shown in FIG. 4B (a page with a data amount of 1024 KB or more), and in which the thumbnail 1010 of the page meeting the condition is displayed in a form different from the thumbnails of other pages, as a display method. That is, the frame line of the thumbnail 1010 is thickened, and the value of the attribute meeting the condition (balloon comment 1012) is displayed.

Figure 11:
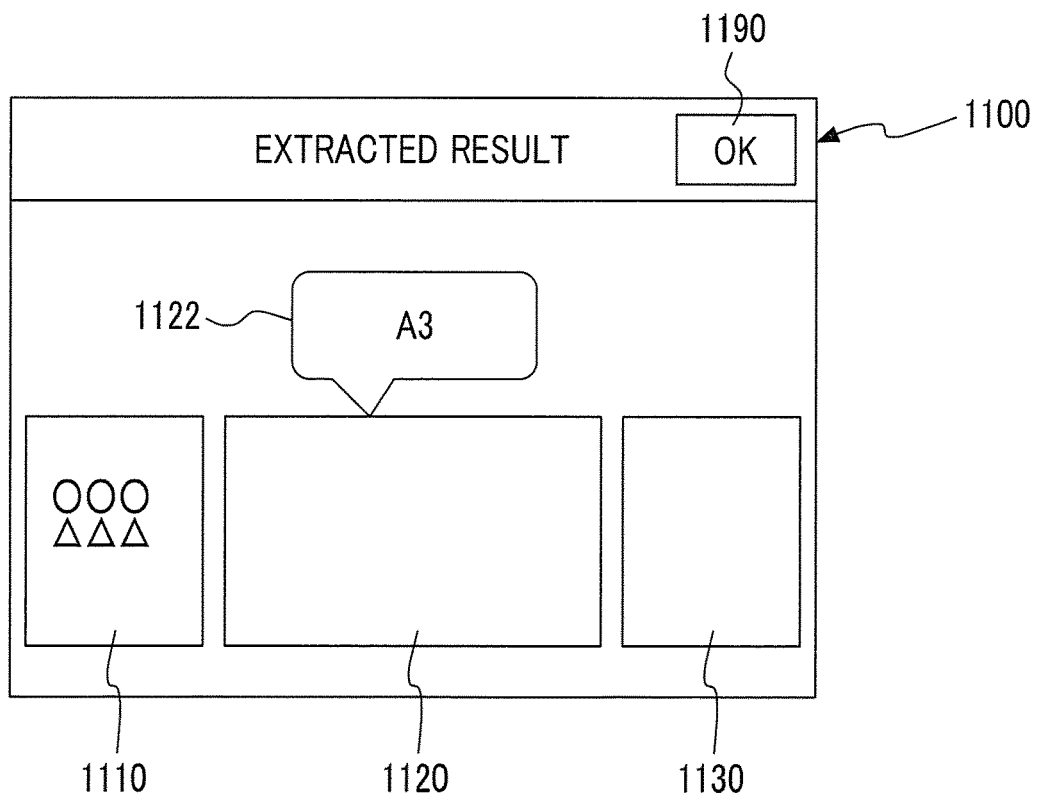
FIG. 11 is an explanatory diagram showing the processing example according to the exemplary embodiment.

FIG. 11 is an explanatory diagram showing a processing example according to the present exemplary embodiment.

A thumbnail 1110, a thumbnail 1120, a thumbnail 1130, and an OK button 1190 are displayed on the screen 1100, and a balloon comment 1122 is displayed on the thumbnail 1120.

This example shows an example which is obtained by extraction according to the setting shown in FIG. 4B (a page with a document size A3), and in which the thumbnail 1120 of the page meeting the condition is displayed in a form different from the thumbnails of other pages, as a display method. That is, the value of the attribute meeting the condition (balloon comment 1122) is displayed for the thumbnail 1120.

Figure 12:
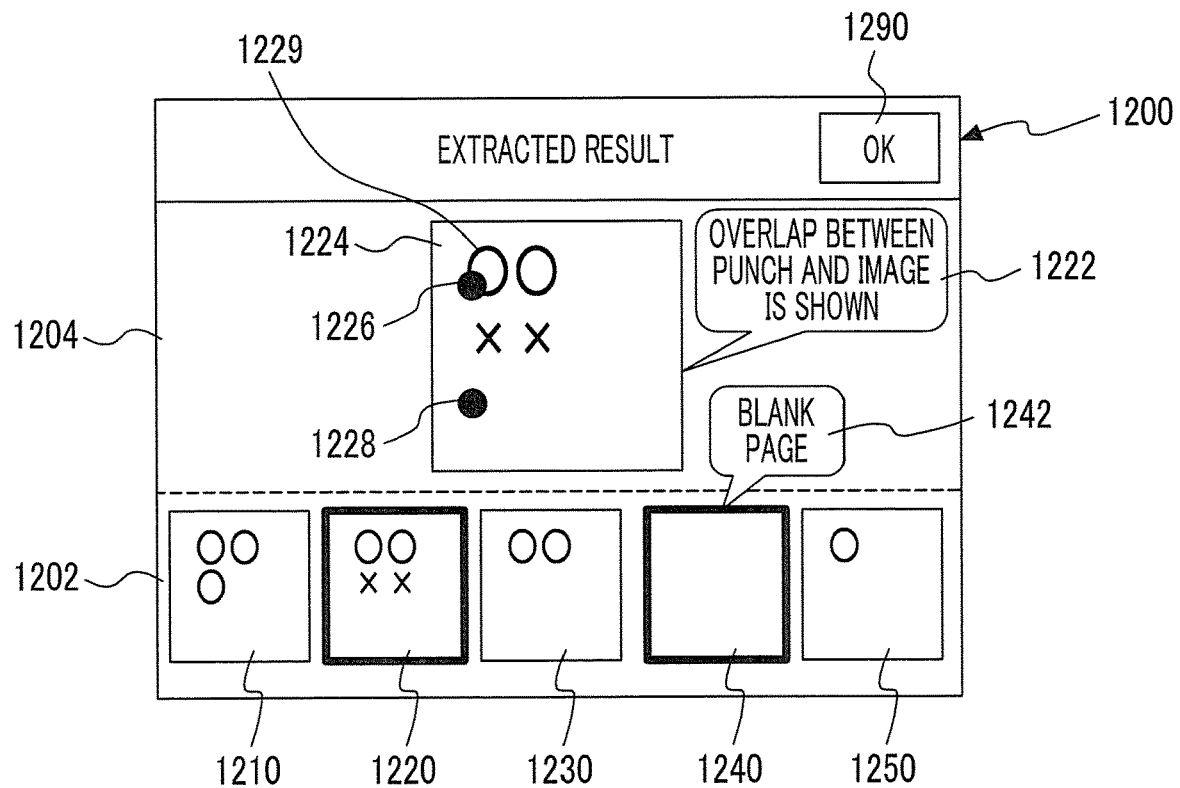
FIG. 12 is an explanatory diagram showing the processing example according to the exemplary embodiment.

FIG. 12 is an explanatory diagram showing the processing example according to the present exemplary embodiment.

A thumbnail display area 1202, a checking area 1204, and an OK button 1290 are displayed on a screen 1200.

A thumbnail 1210, a thumbnail 1220, a thumbnail 1230, a thumbnail 1240, and a thumbnail 1250 are displayed in the thumbnail display area 1202, and a balloon comment 1242 is displayed on the thumbnail 1240.

A checking image 1224 is displayed in the checking area 1204. A balloon comment 1222, a punch hole 1226, and punch hole 1228 are displayed in the checking image 1224.

This example shows an example which is obtained by extraction according to the setting shown in FIG. 4C (a page with overlap between the staple/punch position and the image or a blank page), and in which the thumbnail 1220 and the thumbnail 1240 of the pages meeting the condition are displayed in a form different from the thumbnails of other pages, as a display method. That is, the frame lines of the thumbnail 1220 and the thumbnail 1240 are thickened, and the value of the attribute meeting the condition (balloon comment 1242) is displayed. With respect to the thumbnail 1220, the checking image 1224 is displayed in the checking area 1204, and the balloon comment 1222 (overlap between the punch and the image is shown) is displayed on the checking area 1204. The checking image 1224 is the same image as the thumbnail 1220 and is enlarged in accordance with the checking area 1204. Thus, it is clearly understood that the image 1229 and the punch hole 1226 in the checking image 1224 overlap each other.

Figure 13:
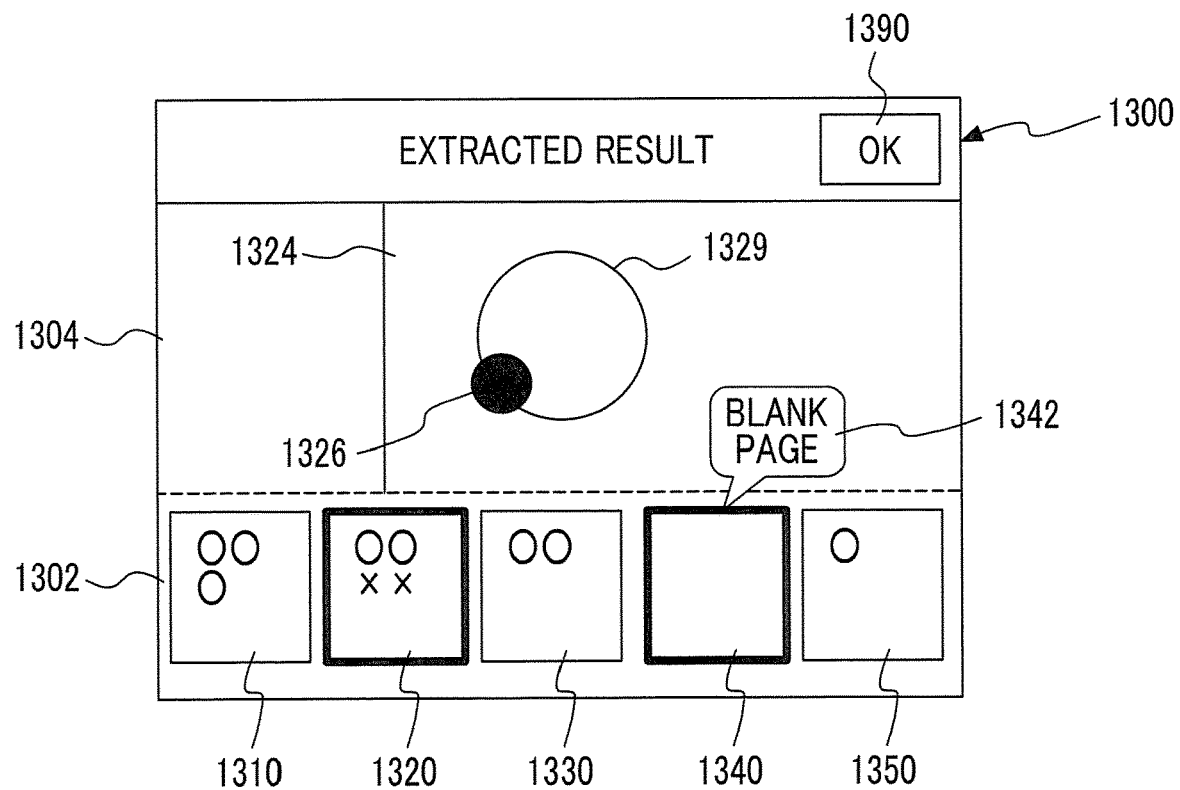
FIG. 13 is an explanatory diagram showing the processing example according to the exemplary embodiment.

FIG. 13 is an explanatory diagram showing the processing example according to the present exemplary embodiment.

A thumbnail display area 1302, an enlarged display area 1304, and an OK button 1390 are displayed on a screen 1300.

A thumbnail 1310, a thumbnail 1320, a thumbnail 1330, a thumbnail 1340, and a thumbnail 1350 are displayed in the thumbnail display area 1302, and a balloon comment 1342 is displayed on the thumbnail 1340.

The enlarged checking image 1324 is displayed in the enlarged display area 1304.

The display example in FIG. 13 is equivalent to the display example in FIG. 12, and shows an example which is obtained by extraction according to the setting shown in FIG. 4C (a page with overlap between the staple/punch position and the image or a blank page), and in which the thumbnail 1320 and the thumbnail 1340 of the pages meeting the condition are displayed in a form different from the thumbnails of other pages, as a display method. That is, the frame lines of the thumbnail 1320 and the thumbnail 1340 are thickened, and the value of the attribute meeting the condition (balloon comment 1342) is displayed. With respect to the thumbnail 1320, the portion corresponding to the condition is enlarged and displayed in the enlarged checking image 1324 in the enlarged display area 1304. The enlarged checking image 1324 is the same image as the thumbnail 1320 and is enlarged more than the checking image 1224 shown in the example of FIG. 12, and the portion where the image 1329 and the punch hole 1326 overlap is enlarged and displayed. Thus, it is clearly understood that the image 1329 and the punch hole 1326 in the enlarged checking image 1324 overlap each other.

Figure 14:
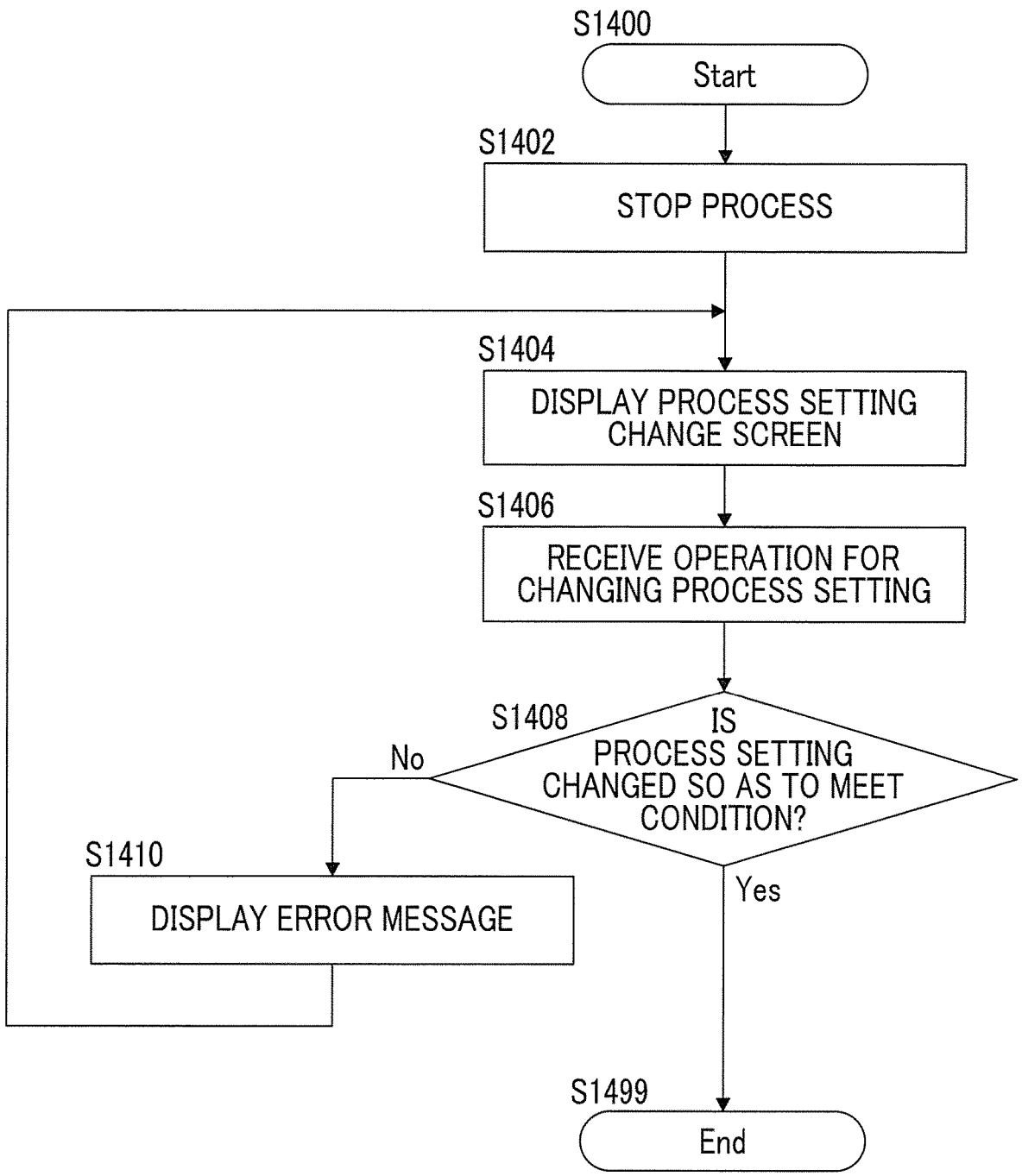
FIG. 14 is a flowchart showing the processing example according to the exemplary embodiment.

FIG. 14 is a flowchart showing the processing example according to the present exemplary embodiment. FIG. 14 shows a processing example in a case where a page meeting the condition is found.

In particular, this process may be performed in a case where the image processing apparatus 250 performs a real time preview process.

For example, in a case of setting an attribute that the user has set in advance and extracting a page meeting the information while the document is being read (during a so-called job), the process is stopped.

In step S1402, the process is stopped (including temporary stop). For example, the image reading process (scanning process) is stopped.

In step S1404, a process setting change screen is displayed. For example, in a case where a page meets the condition that it is equal to or more than the upper limit data amount of electronic data, a process setting change screen for changing the reading resolution or a process setting change screen for changing the color reading to monochrome reading is displayed. Further, a process setting change screen for changing the setting (for example, number or position) of stapling or punching is displayed.

In step S1406, an operation for changing the process setting is received.

In step S1408, it is determined whether or not the process setting is changed so as to meet the condition. In a case where the process setting is changed, the process is terminated (step S1499); otherwise, the process proceeds to step S1410. For example, in the above-described example, setting to lower the resolution on the process setting change screen for changing the reading resolution corresponds to "the process setting is changed so as to meet the condition". Further, setting to read in monochrome reading on the process setting change screen for changing the color reading to monochrome reading corresponds to "the process setting is changed so as to meet the condition". On the process setting change screen for changing the settings of stapling or punching, it is determined whether or not there is an overlap with the image in the target page at the changed stapling or punching position, the case where there is no overlap corresponds to "the process setting is changed so as to meet the condition".

In step S1410, an error message is displayed, and the process returns to step S1404.

After the determination in step S1408 becomes Yes, the processing is reperformed with the changed process setting. Specifically, so as to again read the target page, a message ("One more time, please scan the target page again", or the like) is displayed to allow the user to perform the scan operation.

Figure 15:
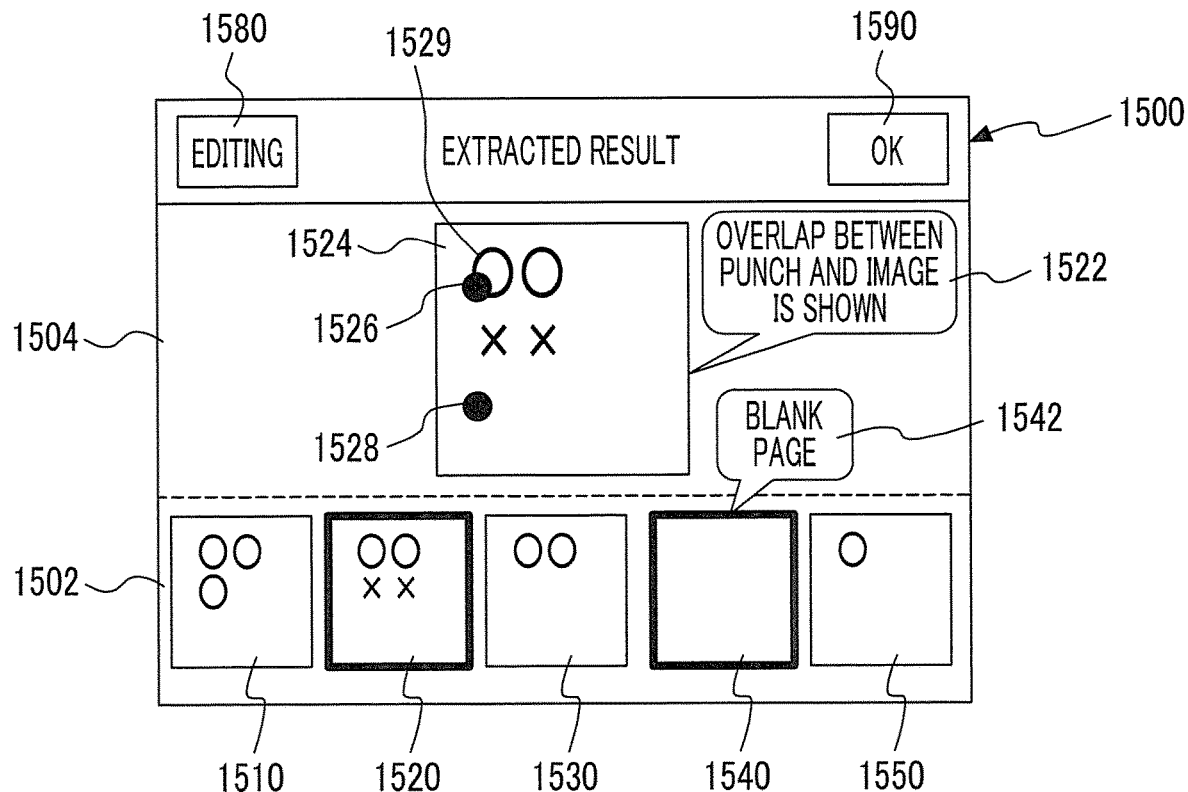
FIG. 15 is an explanatory diagram showing the processing example according to the exemplary embodiment.

FIG. 15 is an explanatory diagram showing a processing example according to the present exemplary embodiment.

On screen 1500, a thumbnail display area 1502, a checking area 1504, an edit button 1580, and an OK button 1590 are displayed.

A thumbnail 1510, a thumbnail 1520, a thumbnail 1530, a thumbnail 1540, and a thumbnail image 1550 are displayed in the thumbnail display area 1502, and a balloon comment 1542 is displayed on the thumbnail 1540.

A checking image 1524 is displayed in the checking area 1504. The balloon comment 1522, the punch hole 1526, and the punch hole 1528 are displayed in the checking image 1524.

It is equivalent to that shown in the example of FIG. 12, but an edit button 1580 is added. In a case where the edit button 1580 is selected, a screen 1600 (process setting change screen for changing the setting of punching) shown in the example of FIG. 16 is displayed.

Figure 16:
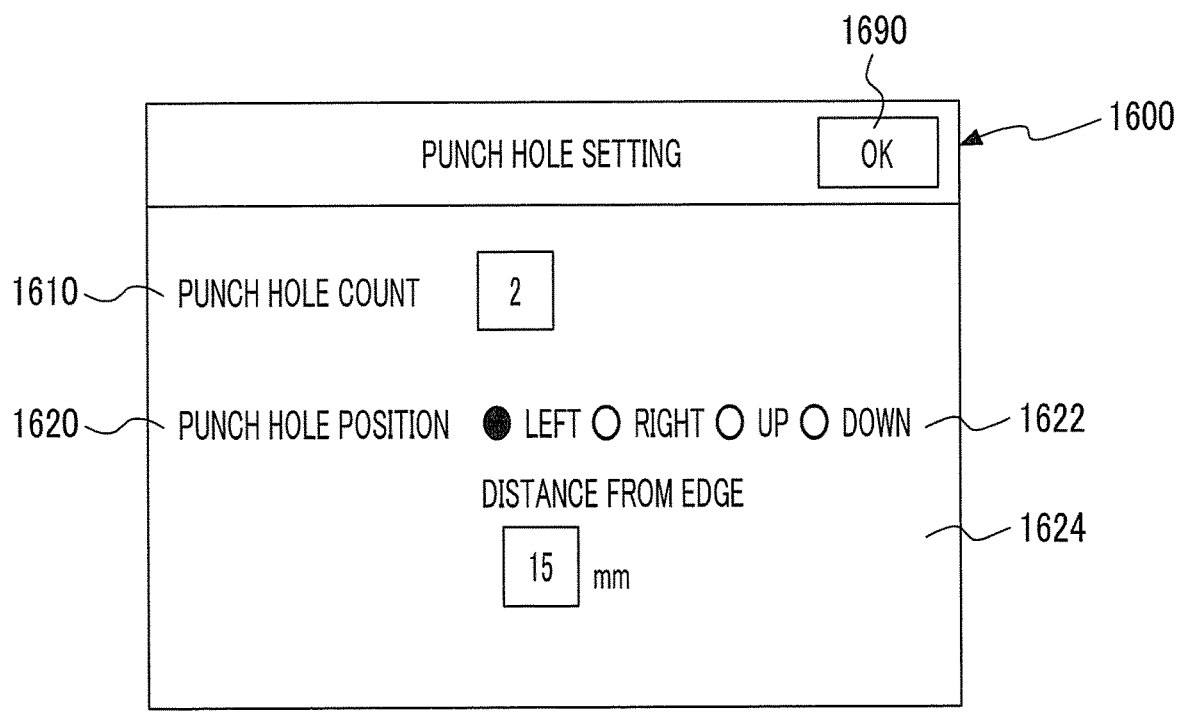
FIG. 16 is an explanatory diagram showing the processing example according to the exemplary embodiment.

FIG. 16 is an explanatory diagram showing the processing example according to the present exemplary embodiment.

The screen 1600 has a punch hole count setting area 1610, a punch hole position setting area 1620, and an OK button 1690.

In the punch hole position setting area 1620, a left/right up/down setting area 1622 and a position setting area 1624 are displayed.

The position setting area 1624 is used to set a punch hole according to the distance from the edge set in the left/right up/down setting area 1622. In order to eliminate the overlap between the punch hole and the image, for example, it is desirable that the position of the punch hole is close to the edge. That is, by image processing, in a case where a value equal to or larger than the current value is set in the position setting area 1624, or in a case where the position of the image 1529 overlapping the punch hole 1526 is detected and the position of the punch hole 1526 is changed such that the position does not overlap the image 1529, the determination is "Yes" in step S1408.

Further, by image processing, in a case where the position of the image 1529 is detected, a position not overlapping the image 1529 is calculated, the value of the position setting area 1624 is corrected to a value indicating the calculated position (as a default value), the screen 1600 may be displayed.

According to the present exemplary embodiment, for example, the following processes become possible.

(1) In a case where the upper limit data amount is determined in order to store the scanned image, there is a case where it is desired to rescan by lowering the resolution only for the image whose data amount is equal to or larger than the upper limit data amount. In order to scan the document and select the page (image) whose file size is equal to or larger than the upper limit data amount, the "file size upper limit value" (file upper limit setting 410) is set in the extraction setting of the user interface shown in the examples of FIGS. 4A to 4C, and the scanning job is executed. Among the read documents, candidates of which and the resolution and color attribute need to be changed because the file size thereof is equal to or larger than the file size upper limit value are displayed as thumbnails in a list.

(2) In a case where the upper limit data amount is determined in order to store the scanned image, it may be desired to extract only the color images and change some of the color images to monochrome. The scan job is executed by setting "color image" (color mode setting 420) in the extraction setting of the user interface shown in the examples of FIGS. 4A to 4C. Among the read documents, only pages with color images are displayed as thumbnails in a list.

(3) In a case where the upper limit data amount is determined in order to store the scanned image, there is a case where it is desired to reduce the file size by changing the resolution or the color mode only for the image whose data amount is equal to or larger than the upper limit data amount. In order to scan the document and select the page (image) whose file size is equal to or larger than the upper limit data amount, the "file size upper limit value" (file upper limit setting 410) is set in the extraction setting of the user interface shown in the examples of FIGS. 4A to 4C, and the scanning job is executed. Then, the image of the document being read can be checked by the preview of the thumbnail, and only the image of the page whose parameter is to be changed because the file size is equal to or larger than the upper limit data amount is highlighted and displayed. By being highlighted, the user may clearly specify the page to be checked, so that it is possible to change the resolution and the color mode of the page whose image quality may be degraded, while visually determining the pages, among the highlighted pages.

(4) In a case of scanning a document in which documents of A4 size and A3 size are mixed and mailing the scanned document to group members, in a case where it is desired to check whether there is a vertical and horizontal size of A3 size, the scan job is executed by setting "document size=A3" (document size setting 430) in the extraction setting of the user interface shown in the examples of FIGS. 4A to 4C. It is possible to check the image of the document being read by the preview of the thumbnail, only pages of A3 size are highlighted and displayed. By being highlighted, the user may clearly specify the page to be checked, and make the setting change by visually checking and determining the highlighted page with errors in the vertical and horizontal directions.

(5) In a case where it is desired to staple in copying, the preview of the copy job is executed by setting "staple/punch position being on the image" (staple/punch position setting 450) in the extraction setting of the user interface shown in the examples of FIGS. 4A to 4C. Then, it is possible to check the page of the document being read by the preview, only the page where the staple position is on the image is highlighted and displayed. By being highlighted, the user may clearly specify the page to be checked, it is possible to adjust the staple position and output it.

(6) In a case where there is a blank page in a document in which plural documents are combined, the blank page may or may not have meaning. In a case where it is desired to check whether there is a blank page in such a document (not automatic deletion) and to delete the blank page according to need, the scan job is executed by setting "with blank page" (blank page setting 440) in the extraction setting of the user interface shown in the examples of FIGS. 4A to 4C. It is possible to check the image of the document being read by the preview of the thumbnail, only blank page is highlighted and displayed. By being highlighted, the user may clearly specify the page to be checked, and delete the blank page by visually checking and determining the highlighted page as a blank page to be deleted.

Figure 17:
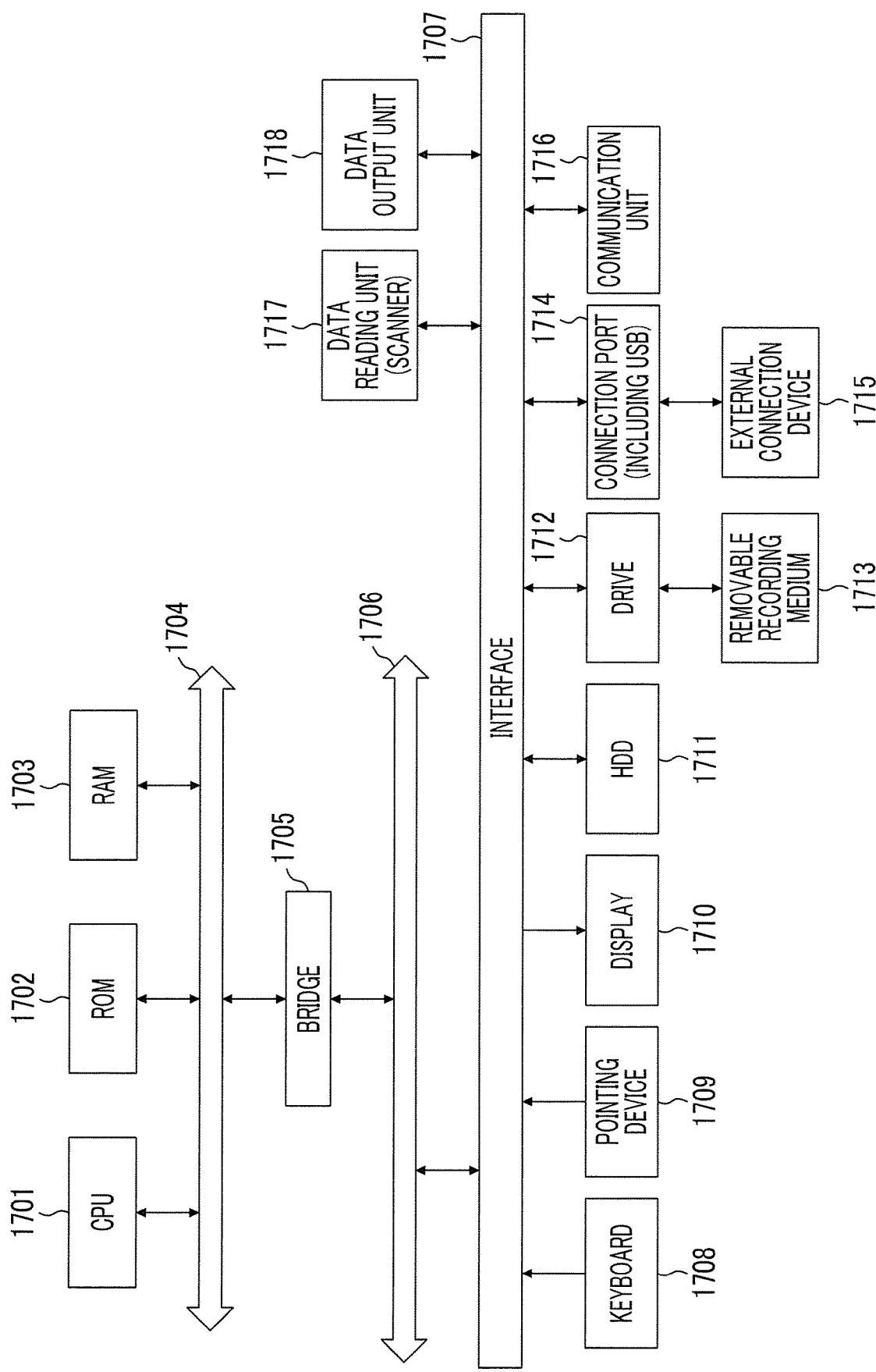
FIG. 17 is a block diagram showing an example of a hardware configuration of a computer that implements the exemplary embodiment.

With reference to FIG. 17, a hardware configuration example of the information processing apparatus 100 according to the present exemplary embodiment will be described. The configuration shown in FIG. 17 is, for example, the configuration of a personal computer (PC) or the like, and shows an example of a hardware configuration including a data reading unit 1717 such as a scanner and a data output unit 1718 such as a printer.

A central processing unit (CPU) 1701 is a control unit that executes a process according to the computer program describing the execution sequences of various modules described in the above-described exemplary embodiment, that is, modules such as the acquisition module 105, the page search module 115, the display control module 120, and the display module 125.

A read only memory (ROM) 1702 stores programs, operation parameters, and the like used by a CPU 1701. A random access memory (RAM) 1703 stores programs to be used in the execution of the CPU 1701, parameters appropriately changed in the execution thereof, and the like. These are mutually connected by a host bus 1704 which is a CPU bus or the like.

The host bus 1704 is connected to an external bus 1706 such as a peripheral component interconnect/interface (PCI) bus through a bridge 1705.

A keyboard 1708 and a pointing device 1709 such as a mouse are devices operated by an operator. A display 1710 is a liquid crystal display device or a cathode ray tube (CRT) and the like, and displays various types of information as text or image information. A touch screen or the like having both functions of the pointing device 1709 and the display 1710 may be used. In that case, with respect to realization of the function of the keyboard, the function of the keyboard may be realized by drawing a keyboard (a so-called software keyboard, screen keyboard or the like) by software on the screen (touch screen) without physical connection it as the keyboard 1708.

A hard disk drive (HDD) 1711 incorporates a hard disk (which may be a flash memory or the like), drives the hard disk, and records or plays back programs and information to be executed by the CPU 1701. The hard disk realizes the function as the condition storage module 110 and the like. Furthermore, various other data, various computer programs, or the like are stored.

A drive 1712 reads data or a program recorded on a removable recording medium 1713 such as a mounted magnetic disk, optical disk, magneto-optical disk, semiconductor memory or the like, and transmits the data or program to the RAM 1703 connected through an interface 1707, the external bus 1706, the bridge 1705, and the host bus 1704. The removable recording medium 1713 can also be used as a data recording area.

The connection port 1714 is a port to which the external connection device 1715 is connected, and has a connection portion such as USB and IEEE 1394. The connection port 1714 is connected to the CPU 1701 and the like through the interface 1707, the external bus 1706, the bridge 1705, the host bus 1704, and the like. The communication unit 1716 is connected to a communication line and executes a data communication process with the outside. The data reading unit 1717 is, for example, a scanner, and executes a document reading process. The data output unit 1718 is, for example, a printer, and executes a document data output process.

The hardware configuration of the information processing apparatus 100 shown in FIG. 17 shows one configuration example, and the present exemplary embodiment is not limited to the configuration shown in FIG. 17, but may have any configuration as long as the modules described in the exemplary embodiment can be executed. For example, some of the modules may be configured with dedicated hardware (for example, an application specific integrated circuit (ASIC), or the like), some of the modules may be in an external system and be connected through a communication line, and in addition, plural systems shown in FIG. 17 may be connected to each other through a communication line so that the plural systems cooperate with each other. Further, in addition to personal computers, in particular, the modules may be incorporated into portable information communication devices (including mobile phones, smartphones, mobile devices, wearable computers, or the like), information appliances, robots, copiers, faxes, scanners, printers, multifunction peripherals (image processing apparatuses having any two or more functions such as scanners, printers, copiers, and faxes), and the like.

In addition, in the comparison process in the description of the above-described exemplary embodiment, unless inconsistencies arise in the combination, "greater than or equal to", "less than or equal to", "greater than", and "smaller than (less than)" may be "greater than", "smaller than (less than)", "greater than or equal to", and "less than or equal to", respectively.

Note that the above-described program may be provided by being stored in a recording medium, or the program may be provided by communication means. In that case, for example, the above-described program may be regarded as an invention of "a computer readable recording medium storing a program".

"Computer-readable recording medium storing a program" refers to a recording medium on which programs are recorded, which can be read by a computer, and is used for installing and executing programs, distributing programs, and the like.

Examples of the recording medium include a digital versatile disk (DVD) ("DVD-R, DVD-RW, DVD-RAM, or the like" which is a standard defined by a DVD forum and "DVD+R, DVD+RW, or the like" which is a standard defined by DVD+RW), a compact disc (CD) (a read-only memory (CD-ROM), a CD recordable (CD-R), a CD rewritable (CD-RW), or the like), a Blu-ray (registered trademark) Disc, a magneto-optical disk (MO), a flexible disk (FD), a magnetic tape, a hard disk, a read only memory (ROM), an electrically erasable and rewritable read only memory (EEPROM (registered trademark)), a flash memory, a random access memory (RAM), a secure digital (SD) memory card, or the like.

The whole or a part of the program may be stored or distributed by being recorded in the recording medium. Further, the program may be transmitted through communication, for example, by using a transmission medium such as a wired network used for a local area network (LAN), a metropolitan area network (MAN), a wide area network (WAN), the Internet, an intranet, an extranet, or the like, a wireless communication network, or a combination thereof, or may be carried on a carrier wave.

Furthermore, the program may be a part or the whole of another program, or may be recorded on a recording medium together with a separate program. Further, the program may be divided and recorded on plural recording media. Further, the program may be recorded in any manner as long as the program can be restored, such as compression or encryption.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   an acquisition unit that acquires electronic data; and
   a display control unit that in a case where there is a page meeting a predetermined condition in the electronic data, performs control to display a thumbnail of the page,
   wherein a process is performed while acquiring the electronic data, and during acquisition, in a case where the page meeting the condition is acquired, the process is stopped,
   wherein after the process is stopped, a display for attribute change is performed such that an operation for changing to an attribute not meeting the condition is available, and the process is resumed on condition that the attribute change is performed.

2. The information processing apparatus according to claim 1,
   wherein the display control unit performs control to display the thumbnail of the page meeting the condition in a form different from a thumbnail of a page not meeting the condition.

3. The information processing apparatus according to claim 1,
   wherein the display control unit performs control to display a thumbnail of only a page not meeting the condition.

4. The information processing apparatus according to claim 1,
   wherein the display control unit performs control to enlarge and display a portion corresponding to the condition.

5. The information processing apparatus according to claim 1,
   wherein the condition is related to an attribute of the page.

6. The information processing apparatus according to claim 5,
   wherein the attribute is any one of a monochrome image, a color image, and a document size.

7. The information processing apparatus according to claim 1,
   wherein the condition is whether the page is in a normal state or not.

8. The information processing apparatus according to claim 7,
   wherein the normal state is a state where a relationship between a reading direction and a page direction is appropriate, or a position of an accessory is appropriate.

9. A non-transitory computer readable medium storing an information processing program causing a computer to function as:
   an acquisition unit that acquires electronic data; and
   a display control unit that in a case where there is a page meeting a predetermined condition in the electronic data, performs control to display a thumbnail of the page,
   wherein a process is performed while acquiring the electronic data, and during acquisition, in a case where the page meeting the condition is acquired, the process is stopped,
   wherein after the process is stopped, a display for attribute change is performed such that an operation for changing to an attribute not meeting the condition is available, and the process is resumed on condition that the attribute change is performed.

10. An information processing apparatus comprising:
    acquisition means for acquiring electronic data; and
    display control means for in a case where there is a page meeting a predetermined condition in the electronic data, performing control to display a thumbnail of the page,
    wherein a process is performed while acquiring the electronic data, and during acquisition, in a case where the page meeting the condition is acquired, the process is stopped,
    wherein after the process is stopped, a display for attribute change is performed such that an operation for changing to an attribute not meeting the condition is available, and the process is resumed on condition that the attribute change is performed.

* * * * *